(12) United States Patent
Hayes et al.

(10) Patent No.: US 8,646,157 B2
(45) Date of Patent: *Feb. 11, 2014

(54) HOOK AND CONNECTOR DEVICE

(76) Inventors: Daniel S. Hayes, Hayden Lake, ID (US);
Edwin J. Fehringer, Hayden, ID (US);
Daniel J. Fehringer, Coeur d'Alene, ID (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/587,305

(22) Filed: Oct. 5, 2009

(65) Prior Publication Data
US 2010/0024177 A1 Feb. 4, 2010

Related U.S. Application Data

(63) Continuation-in-part of application No. 11/893,026, filed on Aug. 14, 2007, now Pat. No. 7,603,754.

(51) Int. Cl.
*A44B 13/00* (2006.01)
*F16B 45/00* (2006.01)

(52) U.S. Cl.
USPC ....... 24/586.1; 24/372; 24/588.1; 24/DIG. 42

(58) Field of Classification Search
USPC .................. 59/85, 90; 24/372, 588.1–588.12, 24/DIG. 42, 586.1, 586.11
See application file for complete search history.

(56) References Cited

U.S. PATENT DOCUMENTS

| 1,689,824 | A | * | 10/1928 | Goelz | 439/288 |
|---|---|---|---|---|---|
| D92,798 | S | * | 7/1934 | Furtsch | D11/208 |
| 2,447,422 | A | * | 8/1948 | Nelson | 24/583.11 |
| 6,443,795 | B1 | * | 9/2002 | Lin | 446/85 |
| 7,603,754 | B2 | * | 10/2009 | Hayes et al. | 24/586.1 |

* cited by examiner

*Primary Examiner* — Robert J Sandy
(74) *Attorney, Agent, or Firm* — John S. Reid

(57) ABSTRACT

A hook-connector includes a first hook part and a second hook part. Each hook part includes a first plate and a second plate. The plates have a cord opening defined there-through. The hook-connector further includes a hub disposed between the first and second plates which hold the plates in essentially parallel, spaced apart relationship. The hook-connector further includes a hook member attached to a first end of at least one of the first or second plates. The hook member includes a hook element defining a hook opening, and the hook opening is sized to receive the hub of a corresponding hook part. The hook-connector further includes a means for ensuring a positive and releasable engagement of each hook element about the hub of the corresponding hook part.

11 Claims, 11 Drawing Sheets

HOOK AND CONNECTOR DEVICE

CROSS REFERENCE TO RELATED APPLICATIONS

This application is a continuation-in-part under 35 U.S.C. §120 of U.S. patent application Ser. No. 11/893,026, filed Aug. 14, 2007 now U.S. Pat No. 7,603,754, which is hereby incorporated by reference herein in its entirety.

BACKGROUND

Hook devices are well known for securing an elongated flexible member (e.g., a line, cord, rope, cable, strap, chain, etc.) to an anchor point. A hook device is thus any device that is configured to anchor an elongated flexible member to an anchor point in a releasable manner. For example, a simple hook, with an eyelet attached thereto, can serve as a hook device to secure an elongated flexible member passed through the eyelet to an anchor point. Likewise, connector devices are well known for coupling (i.e., connecting) two elongated flexible members in series. (See for example U.S. Pat. No. 2,738,477 (incorporated by reference herein) which describes an in-line clasp connector for an electrical conductor, as well as U.S. Pat. No. 5,224,247 (incorporated by reference herein) which provides for a strap fastener allowing two straps to be connected in series.) All of these devices allow multiple elongated flexible members to be connected in series. However, the prior art connectors are limited in the ways in which they can be connected.

DETAILED DESCRIPTION

Figure 1:
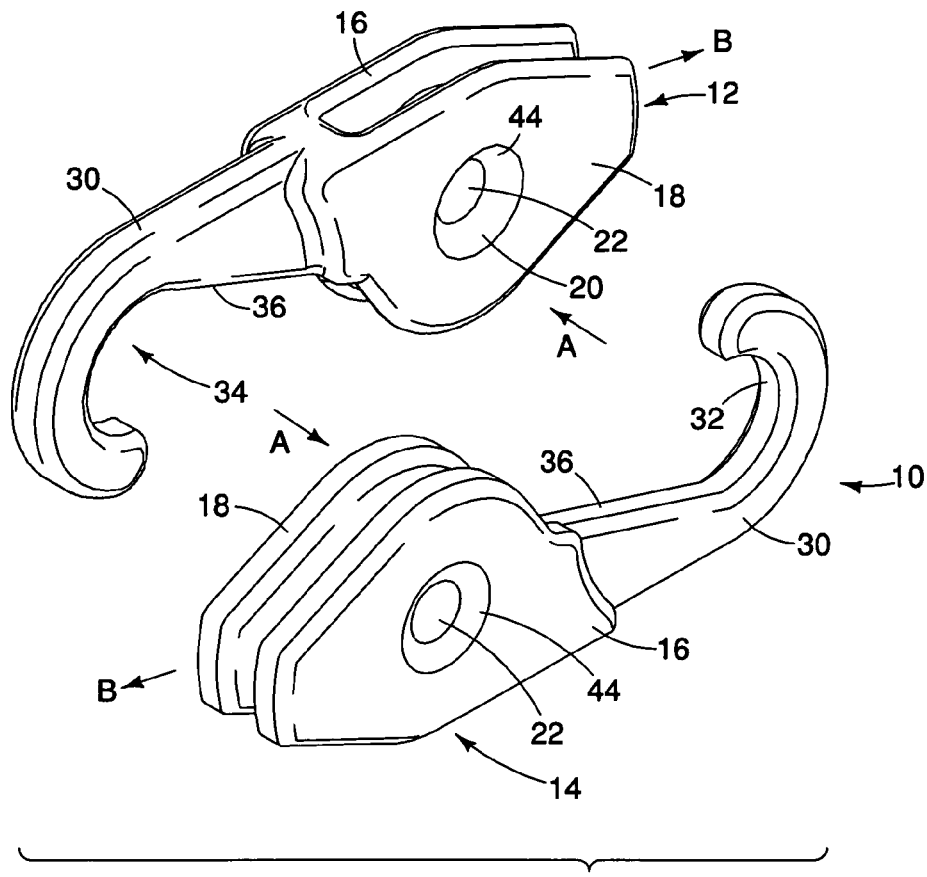
FIG. 1 is an isometric drawing of a hook-connector device in accordance with the present disclosure.

Embodiments of the present disclosure are exemplified in the drawings and will be described using reference numerals to identify various elements and features. Identical or similar elements or features will bear the same reference numerals, and for brevity, description of one element or feature can be understood as describing all other similar or identical elements or features.

As described above, many devices are known for allowing two (or more) elongated flexible members to be connected in series. However, we have determined that none of these devices provide the flexibility to allow three or more elongated flexible members to be connected to one another at a central area using three or more common connectors. (By "common connectors" we mean connectors that are essentially identical to one another in appearance and shape.) That is, in order for the prior art devices to allow three or more elongated flexible members to be connected at a central area, as well as to alternately allow two or more elongated flexible members to be connected in series, some kind of modification is required to the prior art connector components such that they are no longer essentially identical to one another.

We have developed a hook and connector device, as described more particularly below, that includes two common hook parts that are configured to be joined to one another in various ways (as described more fully below), thus providing flexibility of use of the device. For example, in one arrangement two of the common hook parts (each attached to separate ends of a common cord, can be connected to one another to thus form a closed loop (for example, to hold together a bundle of boards or pipes). In another arrangement, two of the common hook parts can be connected to one another to join together, in series, two separate pieces of line or cord. In yet another arrangement, three or more of the common hook parts can be joined together into a closed loop to thus bring together three or more lines or cords attached to the hook parts at a common area (for example, to secure a load within the bed of a pick-up truck).

In the following description, we will use the term "hook-connector device", or "hook-connector", to mean a device that includes two essentially identical "hook parts". Each hook part can function separately as a hook, to thereby secure a line or cord to an anchor point. Further, each hook part can alternatively serve as a connector part (in conjunction with another hook part to thereby secure two lines together in series, or three or more lines together at a common area. It will be appreciated from the following description that the hook-connector device described herein provides a high degree of flexibility of use with respect to the primary components thereof (i.e., the first hook part and the second hook part), as described more fully below. That is, the first hook part and the second hook part of the hook-connector device described herein can be connect to one another in various ways, as well as with subsequent third and additional hook parts (all of essentially similar configuration) to provide a hook-connector system having a high degree of flexibility of use to thereby address a variety of needs, such as securing loads.

It will further be appreciated that the hook-connector device described herein can be used to securely connect two ends of a single cord together, as well as to connect two or more cords in series. Further, the hook-connector device described herein can be used to securely connect three or more separate cords together at a common area. As used herein, the term "cord" means any elongated, flexible member. Non-limiting examples of a "cord" include: rope; twine; cable; chain; string; elastic cords (i.e., a "Bungee chord"), elongated rubber strands, etc. For example, the hook-connector device described herein can be used to securely connect two ends of a delicate jewelry chain used in a woman's necklace, as well as to secure two docking ropes in series for a super-tanker. While not limiting the scope of the current claims, a typical intended use of the hook-connector device described herein is to secure loads in the bed of a pick-up truck. In the last example (i.e., securing loads in the bed of a pick-up truck), the hook-connector device described herein can be used to: (1) secure a cord to an anchor point in the bed of the pick-up truck; (2) join together two or more cords in series to span the bed of the pick-up truck; and/or (3) join together three or more cords at a common area, each cord being secured to separate anchor points in the bed of the pick-up truck.

From the foregoing it will thus be appreciated that the hook-connector device described herein provides a high degree of flexibility of use with respect to securing one or more cords to anchor points and/or to one another. This flexibility of use of the hook-connector device described herein is enabled by the generally common design of the two primary components of the hook-connector device, that is, the first hook part and the second hook part.

Figure 6:
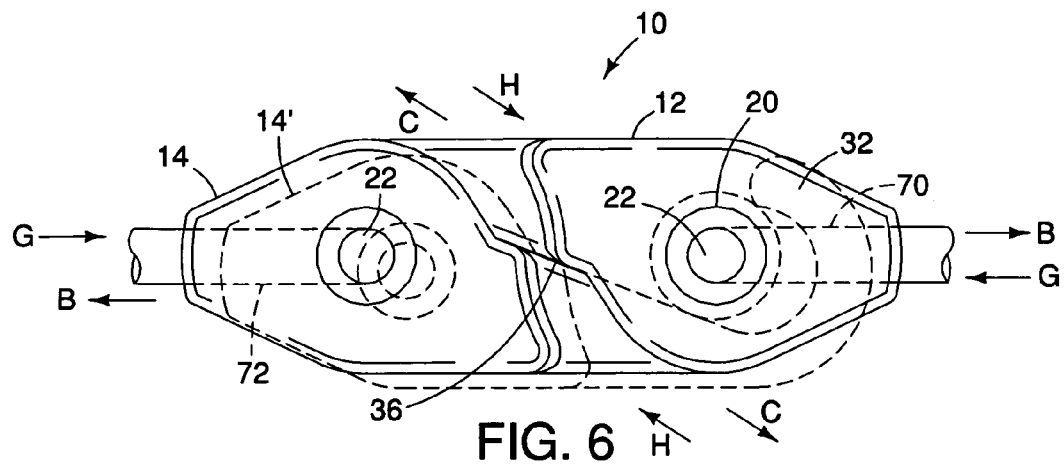
FIG. 6. is a side elevation view of the hook-connector of FIG. 1, depicting a first embodiment of how two of the hook parts of FIG. 1 can be connected to one another.

Turning now to FIG. 1, a hook-connector device 10 in accordance with the present disclosure is depicted in an isometric view. The hook-connector device 10 includes a first hook part 12 and a second hook part 14. As depicted in FIG. 1, the first hook part 12 and the second hook part 14 are configured to be engaged with one another in a first arrangement, to thereby result in the connection depicted in FIG. 6. This engagement (or connection) of the first hook part 12 and the second hook part 14, as depicted in FIGS. 1 and 6, is accomplished by: (i) first moving the first hook part 12 and the second hook part 14 towards one another in relative angular direction "A", and then, once the first hook part 12 and the second hook part 14 are mated in resistive contact, (2) moving the first hook part 12 and the second hook part 14 away from one another in relative linear direction "B", thus causing the first hook part 12 and the second hook part 14 to positively engage one another. As described more fully below (and with particular relevance to FIGS. 7, 8 and 11), other arrangements for connecting the first hook part 12 and the second hook part 14 can also be provided.

Again with respect to FIG. 1, as indicated previously, the hook-connector device 10 includes a first hook part 12 and a second hook part 14. Each hook part (12, 14) includes the following common components, describe below with respect to hook part 12 (it being understood that hook part 14 can include essentially similar components).

Figure 2:
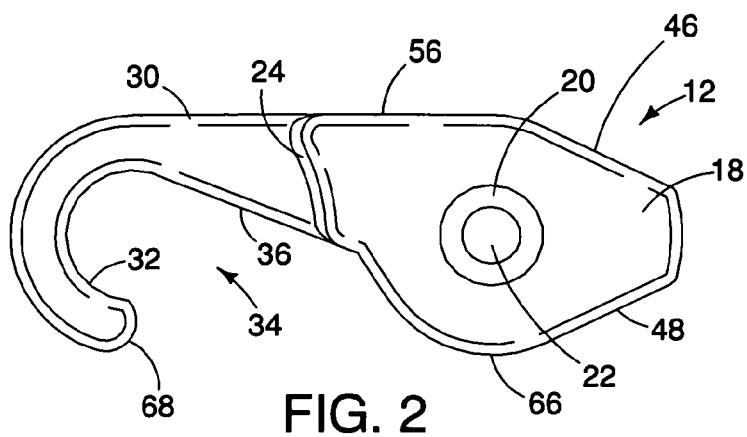
FIG. 2 is a side elevation view of one hook part of the hook-connector device of FIG. 1.
Figure 3:
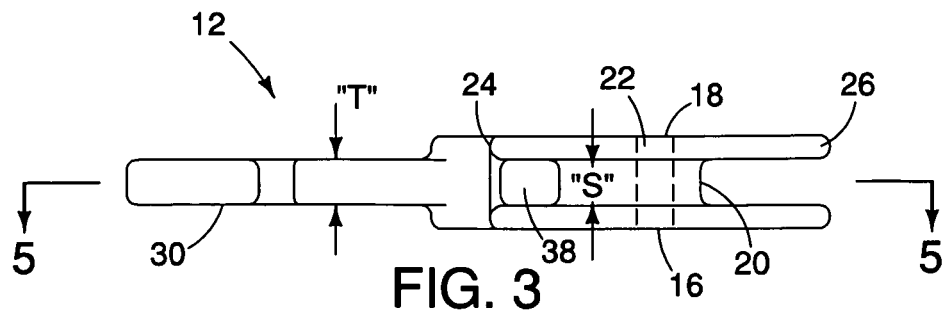
FIG. 3 is a bottom view of the hook part of FIG. 2.
Figure 4:
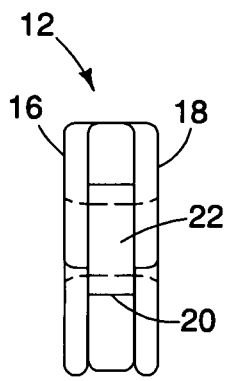
FIG. 4 is an end view of the hook part of FIG. 2.
Figure 5:
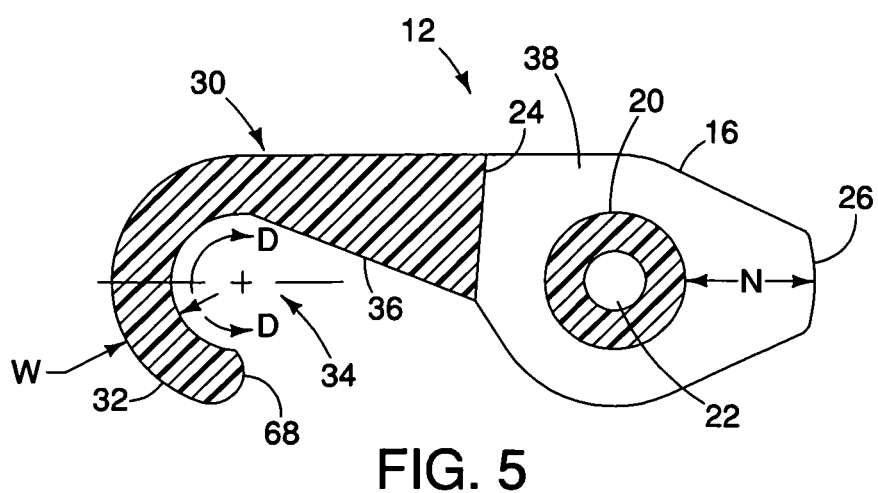
FIG. 5 is a side sectional view of the hook part of FIG. 2.

With respect to hook part 12 (and essentially hook part 14), hook part 12 includes a first plate 16, a second plate 18, and a hub 20 (all of which are better depicted in FIGS. 3-5, which respectively depict a bottom view, and end view, and a side sectional view of the hook part 12 of FIG. 2). The hub 20 is disposed between the first plate 16 and the second plate 18, and holds the first plate 16 and the second plate 18 in essentially parallel, spaced apart relationship to one another. Additionally, the hub 20, and the first and second plates (16, 18) define there-through a cord opening 22. (Cord opening 22 is further depicted in FIGS. 2-5.) Plates 16 and 18 can each be provided with a chamfer 44 at the cord opening 22. Chamfer 44 facilitates freedom of movement of a cord passed through cord opening 22, and further 44 reduces frictional wear on a cord passed through cord opening 22, thus extending the life of the cord. Although depicted as having flat inner and outer flat surfaces, plates 16 and 18 can have outer surfaces that are shaped in a non-flat geometry.

Each hook part (12, 14) further includes a hook member 30, which is attached to a first end (24, FIGS. 2, 3 and 5) of the first and second plates (16 and 18, respectively). The hook member 30 includes a hook element 32, which defines a hook opening 34 (FIGS. 1, 2 and 5). The hook opening 34 is sized to receive the hub (20) of a corresponding hook part. That is, the hook opening 34 of hook part 12 is sized to receive the hub 20 of hook part 14, while the hook opening 34 of hook part 14 is sized to receive the hub 20 of hook part 12. Further, the first and second plates (16, 18) are spaced apart by a distance "S" (FIG. 3), and the hook member 30 is defined by a thickness "T" that is slightly less than dimension "S" to thereby allow the hook element 32 to fit over the hub 20 of a corresponding hook part, but not be loose in fit between the plates (16, 18).

Further, as discussed below, in one embodiment the hook element 32 (and the corresponding hook opening 34 defined thereby) of the first part 12 are sized so that that the hub 20 of the second hook part 14 is resistively received by hook element 32 of the first hook part 12. That is, in this embodiment, a slight resistive force needs to be overcome in order for the hook element 32 of the first hook part 12 to engage the hub 20 of the second hook part 14. (It will be appreciated that the roles of the hook element 32 of the first hook part 12, and the slight resistive force required to engage the hub 20 of the corresponding second hook part 14, are completely interchangeable, such that the hook element 32 of the second hook part 14 requires a slight resistive force to engage the hub 20 of the corresponding hook part 12.) In order to achieve this slight restive force, and with respect to FIG. 5, the hook element 32 circumscribes a distance "D-D" that is slightly greater than 180 degrees. That is, put another way, the hook opening 34 (defined by the hook element 32) circumscribes a distance of slightly less than 180 degrees (but more than about 160 degrees). Further, the hook element 32 is fabricated from a material that has a slight amount of flexibility and resilience so that it will deform slightly and snap over the hub 20 of a corresponding hook part when a sufficient force is applied to the hook element 32. By "sufficient force" we mean a force that is sufficient to cause the hook element 32 to deform to the extent that the hook opening 34 can now receive the hub 20 of a corresponding hook part (12 or 14). The "sufficient force" is applied to the hook element 32 by way of forcing the hook element 32 against the hub 20 of a corresponding hook part (12 or 14). Once the hook element 32 has passed the major diameter of the hub 20 of a corresponding hook part (12 or 14), the resilience in the hook element 32 causes the hook element 32 to assume it's original shape, thus capturing the hub 20 of a corresponding hook part, and thereby securing the two hook parts (12 and 14) to one another.

It will further be appreciated (as discussed further below), that to disengage the hook element 32 of the first hook part 12 from the hub 20 of the second hook part 14, pressing the hub 20 of the second hook part 14 (which is partially encompassed by the hook element 32 of the first hook part 12) against the hook element 32 of the first hook part 12 will cause the hook element 32 (of the first hook part 12) to deform, thus expanding the hook opening 34 of the first hook part 12 so that the hook element 32 of the first hook part 12 can freely pass over the hub 20 of the second hook part 14. It will further be appreciated that, with respect to the foregoing description, the roles of (1) the hook element 32 of the first hook part 12, and the hub 20 of the second hook part 14, are entirely interchangeable with respect to the roles of (2) the hook element 32 of the second hook part 14, and the hub 20 of the first hook part 12. That is, the common design of the first hook part 12 and the second hook part 14 allow the hook parts (12, 14) to interact with one another in essentially similar and complementary ways in (1) securing the hook parts (12, 14) to one another, as well as (2) allowing the hook parts (12, 14) to be disengaged from one another.

In the configuration depicted in FIGS. 1 and 6 the hook parts 12 and 14 are guided together in a mating arrangement by virtue of the hook element 32 of each hook part fitting over the hub 20 of the corresponding hook part.

As depicted in FIGS. 1, 2 and 5, the hook member 30 (of either the first or second hook part 12 or 14) can define a sloped portion 36. The sloped portion 36 can be configured to allow the hook member 30 of the respective hook part (12, 14) to engage the hub 20 of the corresponding hook part (respectively, hook part 14 or 12) in the mating arrangement depicted in FIGS. 1 and 6, while thus avoiding interference with the hook member 30 of the corresponding hook part. While the sloped portions 36 of the hook members 30 are depicted in FIGS. 1, 2, 5 and 6 as being straight slopes, this is not a requirement, and the sloped portions 36 can be configured in any geometry in order to avoid interference of the hook members 30 as the hook parts (12, 14) engage as depicted in FIGS. 1 and 6.

In one variation the sloped portions 36 of each hook member 30 can be configured to contact one another as the hook parts 12 and 14 are fitted together in the mating configuration depicted in FIG. 1, and thus assist in guiding the hook parts 12, 14 together in mating arrangement.

In FIG. 6 the dashed line depicting second hook part 14' shows the hook part 14' just prior to being secured to the first hook part 12 (i.e., by pulling in direction "B" on cords 70 and 72 that are passed through the cord openings 22 of respective hook parts 12 and 14), thus causing the hook parts 12 and 14 to initially move together in direction "H" as a result of the engagement of the hook element 32 of each hook part (12, 14) with the hub 20 of the corresponding hook part (14, 12). Once the first and second hook parts (12, 14) have reached the extent of their directional travel in direction "H", further pulling on the cords 70 and 72 in direction "B" will cause the first hook part 12 and the second hook part 14 to securely mate to another in the manner described above.

Likewise, to disconnect the hook parts 12 and 14 from the position depicted in FIG. 6, a user merely has to push the two ends of the assembly (1) together in directions "G" and hubs 20 of the hook parts 12 and 14 will cause the hook members 30 to move in directions "C", thus releasing the hook elements 32 of each hook part (12, 14) from the hub 20 of the corresponding hook part (14, 12). Likewise, in an optional (or additional) configuration, the sloped portions 36 of each hook member 30 can be configured to contact one another during disengagement of the hook parts 12, 14, and thus assist in guiding the hook elements 32 over and away from the hub 20 of the corresponding hook part (14, 12). As discussed more fully below (and in particular, with respect to FIG. 9), the configuration depicted in FIG. 6 is particularly useful to form a closed loop of cords.

Returning to FIG. 5, the hub 20 is positioned relative to the second end 26 of the first plate 16 (as well as with respect to the second end of the second plate 18, of FIG. 3) so as to define a distance "N" between the rearward edge of the hub and the second (26) end of plates 16 and 18. Further, the hook element 32 (FIG. 5) is defined by a width "W" that is approximately one-half of distance "N". Thus, when hook parts 12 and 14 are connected as depicted in FIG. 6, the hook element 32 of each hook part is recessed in a pocket defined between the plates 16 and 18. The advantage of this arrangement is that when a user pushes the two ends of the hook assembly 10 (of FIG. 6) together in directions "G", there will be room for the hook elements 32 of each hook part (12, 14) to move away from the hubs 20 of the corresponding hook parts (14 and 12, respectively), yet still allow the hook elements 32 to stay in the pockets between the plates 16 and 18 (and thus not allow the hook elements 32 to come into contact with the users fingers, which would defeat the disconnecting action of pressing the hook parts 12 and 14 together in direction "G" to disengage them from one another).

Figure 7:
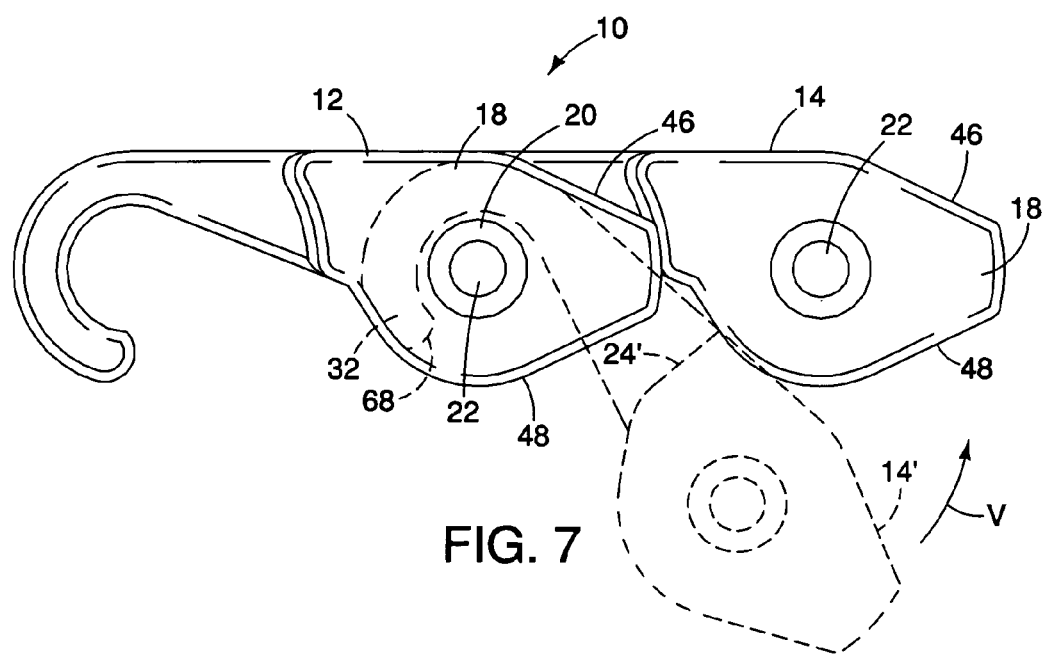
FIG. 7 is a side elevation view of the hook-connector of FIG. 1, depicting a second embodiment of how two of the hook parts of FIG. 2 can be connected to one another.
Figure 11:
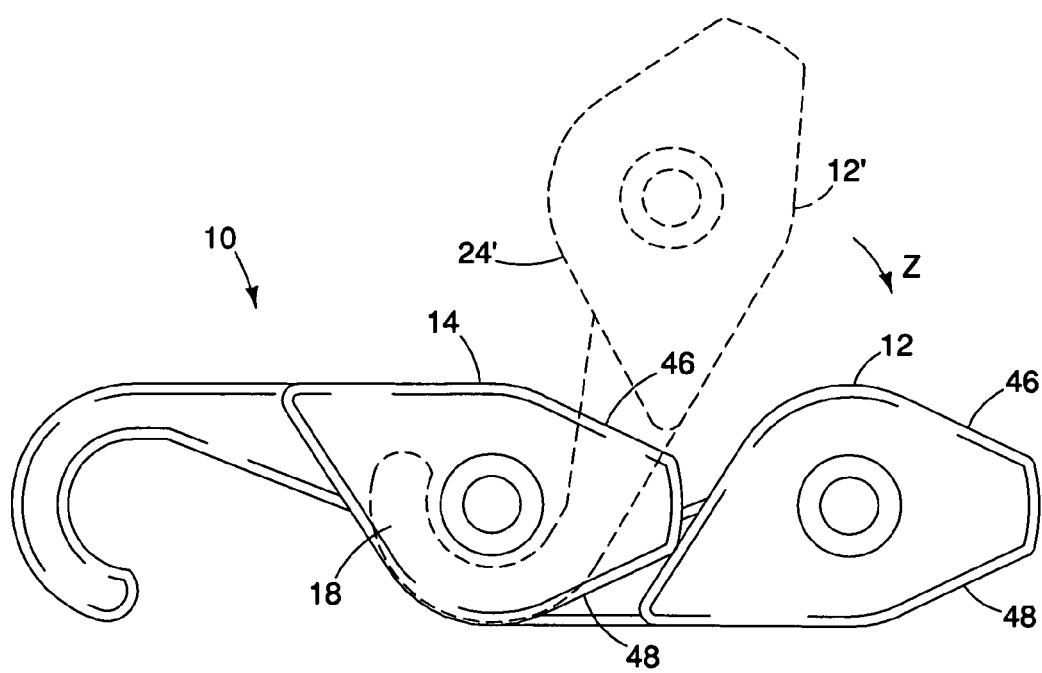
FIG. 11 is a side elevation view of the hook-connector of FIG. 1, depicting a further embodiment of how two of the hook parts of FIG. 10 can be connected to one another.

In a second application of use, as depicted in FIG. 7, the first and second hook parts 12 and 14 can be aligned end-to-end, such that the hook element 32 of the second hook part 14 engages the hub 20 of the first hook part 12, and the hook member 30 of the first hook part 12 is left free to engage a tertiary element (such as a tie down point, or yet a third hook element). Similarly, as depicted in FIG. 11, first and second hook parts 12 and 14 can be inverted with respect to one another and connected in series. While there is no particular advantage to how the hook parts 12 and 14 are connected in series (i.e., as depicted in either FIG. 7 or FIG. 11), what is noteworthy is that the hook-connector system 10 provides a user with system for connecting 2 cords in series without undue effort required on the part of the user to correctly align the hook parts 12 and 14.

In FIGS. 7 and 11 engagement of the first hook part 12 and the second hook part 14 is achieved by guiding the hook end 68 (FIGS. 2, 5 and 7) into the hook passage 38 (FIG. 3), and forcing the hook opening 34 (FIG. 5) over the hub 20 (FIGS. 3, 5 and 7) of the corresponding hook part until the hook element 32 (FIGS. 2, 5 and 7) securely engages the hub (in the manner describe more fully above). In respect of FIG. 7, it will be appreciated that the angled lower end portion 48 of plate 18 (of first hook part 12, as well as and plate 16 of hook part 12, which is not visible in FIG. 7, but can be seen in FIG. 3) allows clearance with the angled first end 24' of second hook part 14, as second hook part 14 is initially engaged with first hook part 12 (as indicated by dashed lines indicating second hook part 14' before being moved to the position indicated by second hook part 14). Likewise, in respect of FIG. 11, the upper angled end portion 46 of the second plate 18 (and plate 16, which is not visible in FIG. 11, but can be seen in FIG. 3) of second hook part 14 allows second hook part 14 to avoid interference with the angled portion 24' of first hook part 12 (12') as first hook part 12 is moved in direction "Z" from the position indicated by first hook part 12' and first hook part 12. That is, the angled upper end portion 46 of plates 16 and 18 (FIGS. 2 and 3), and the angled lower end portion 48 of plates 16 and 18 (FIGS. 2 and 3), allow for the first and second hook parts 12 and 14 to be connected in series, regardless of orientation of the hook parts, because the angled upper end portion 46, and the angled lower end portion 48 of plates 16 and 18 are configured to avoid an interference fit problem with the first end 24 of the plates (16 and 18) of a corresponding hook part.

Figure 8:
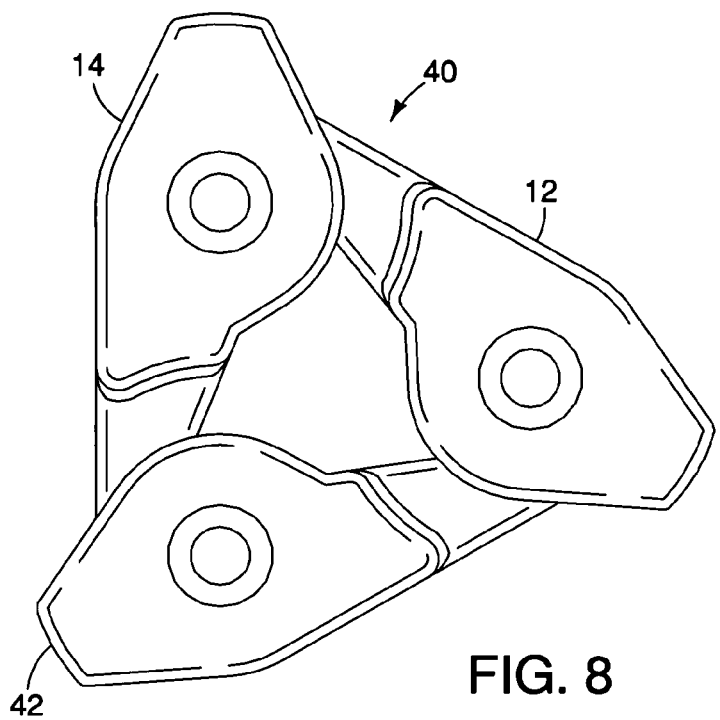
FIG. 8 is a side elevation view depicting a third embodiment of how three of the hook parts of FIG. 2 can be connected to one another.

While, in the Figures, the angled upper end portion 46 and the angled lower end portion 48 of plates 16 and 18 are depicted as being straight angled sections (see FIG. 2, for example), it will be appreciated that the angled upper end portion 46 and the angled lower end portion 48 of plates 16 and 18 can also be curvilinear. The guiding design principal behind the angled upper end portion 46 and the angled lower end portion 48 of plates 16 and 18 is that they avoid interference with the first end 24 of plates 16 and 18 (in a corresponding hook part) as the first and second hook parts 12 and 14 are mated together as depicted in FIGS. 7, 8 and 11.

Returning to FIG. 7, it will be appreciated that once the hook element 32 of the second hook part 14 snaps around the hub 20 of the first hook part 12, the hook parts (12 and 14) may then freely rotate with respect to each other, without risk of becoming disengaged from one another. In fact, as depicted in FIG. 8, by rotating first and second hook parts (12 and 14) 120 degrees (from the position depicted in FIG. 7), a third hook part 42 can be added (i.e., connected) to first and second hook parts 12 and 14, thus forming a closed loop 40 of hook parts (12, 14 and 42). Indeed, it will be appreciated that the loop 40 of hook parts can be expanded to include four, five, or as many hooks parts as is desired. This allows a plurality of cords (as many cords as hook parts) to be joined together at a common area. For example, to secure a load in the bed of a pick-up truck having six anchor points around the perimeter of the bed, six hook parts can be connected in a loop (following FIG. 8), each hook part being secured to one end of a respective cord. The other ends of the six exemplary cords can then be secured to the six anchor points using six more hook parts. As can be seen, it is thus possible to configure complex networks of cords for whatever use is desired using multiples of a single common hook part (such as the common hook part 12 depicted in FIGS. 2-5).

Figure 10:
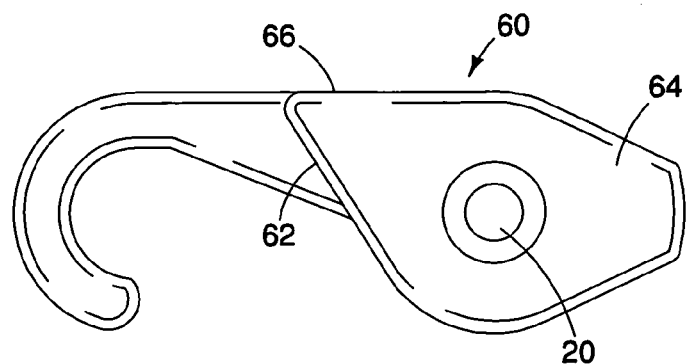
FIG. 10 is a side elevation view of variation of a hook part of FIG. 2.

Returning to FIG. 2, as depicted therein the first end 24 of the second plate 18 is slightly curved (and likewise, for the first end of the first plate 16, as can generally be seen in FIG. 1). This curve allows the first and second hook parts (12, 14) to mate to one another in each of the configurations depicted in FIGS. 6, 7 and 11 without binding between the first and second hook parts (12, 14). Turning now to FIG. 10, one variation of a hook part 60 is depicted. In this variation the first end 62 of second plate 64 is not curved, but rather is flat, and angles downward from a top edge 66 of the hook part 60 towards the centerline of the cord opening 20. (It is understood that the same modification would apply to the first plate of the hook part 60, which is not visible in this view. It will also be understood that this modification would be made to the complimentary hook part of a hook-connector device similar to the device 10 depicted in FIG. 1.) The variation to the first end 62 of the hook plate 64 of FIG. 10 also achieves the function of allowing first and second hook parts (60, and a essentially identical twin, not shown) to mate in each of the configurations depicted in FIGS. 6, 7 and 11, and without binding between the hook parts.

Figure 9:
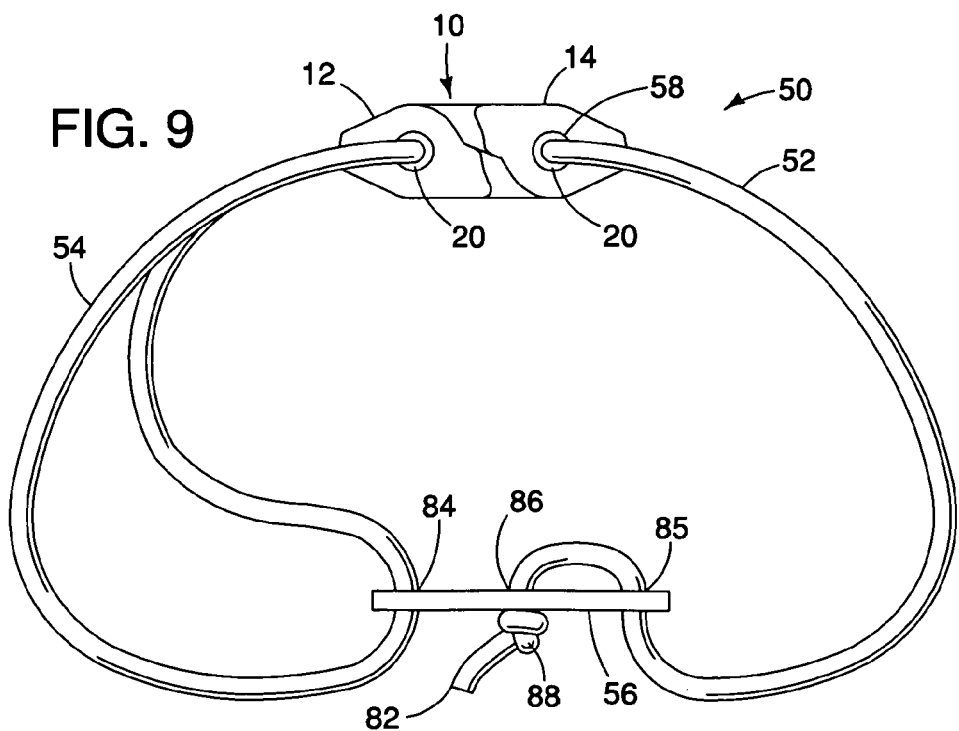
FIG. 9 is a view depicting load securing system that includes the hook-connector of FIG. 1, along with cords connected to each other by a cord length adjustment member.

Turning now to FIG. 9, a further embodiment provides for a load securing system 50. The load securing system 50 includes a hook-connector 10 (as depicted in FIGS. 1 and 6, and described above). The load securing system 50 further includes a first length of cord 54 forming a loop and passing through the cord opening 20 in the first hook part 12. The system also includes a second length of cord 52 which is defined by a second cord first end 58 (which, in FIG. 9 is hidden behind the second hook part 14) and second cord second end 82. The second cord first end (58) is received within, and terminates at, the cord opening 20 in the second hook part 14. The second cord first end (58) can be prevented from freely passing through the cord opening 20 by knotting the cord end 58, or attaching a blocking device to the cord end 58, or by securing the cord end 58 to the cord 52 proximate the cord opening 20 in the second hook part 14. The system 50 further includes a cord length adjustment member 56, which, as depicted in FIG. 9 in side view, consists of a flat plate having three cord holes (84, 85 and 86, not clearly visible in FIG. 9 because of the side view of the cord length adjustment member 56). As depicted, the first length of cord 54 passes through the first cord hole 84. Further, the second cord (52) second end 82 first passes through the second cord hole 85, and then passes through, and terminates at, the third cord hole 86. The second cord second end 82 is knotted (88) or otherwise prevented from passing out through the third cord hole 86. To adjust (e.g., shorten) the size of the loop formed by the first and second cords (54, 52), a length of the second cord 52 is first pushed through the second cord hole 85 to form a short loop of cord between the second and third cord holes (85, 86). Then the second cord second end 82 is pulled downward to take up the slack cord in the short loop of cord between the second and third cord holes (85, 86). Since the cord holes 85 and 86 have relatively sharp edges, the cord 52 will bind against the cord length adjustment member 56. In this way, an adjustable length loop of cord can be formed to, for example, secure a bundle of PVC pipes, and the hook-connector 10 can be used for quick and easy closing and opening of the loop.

It will be appreciated that plates 16 and 18 can be slightly curved so as to increase the distance "S" there between at the second end 26 of the plates (see FIG. 3) to thereby facilitate engagement of the hook member 30 of a corresponding hook part. Further, plates 16 and 18 do not need to be solid, but can have holes formed there through to reduce mass and material requirements. It will be further appreciated that cord opening 22 does not need to be round, as is depicted in the figures. Further, sloped portion 36 of the hook member 30 (see FIGS. 2 and 5) does not need to be linear (as depicted), but can also be curved to provide an enhanced camming action between sloped portions 36 of the hook parts 12 and 14.

Figure 12:
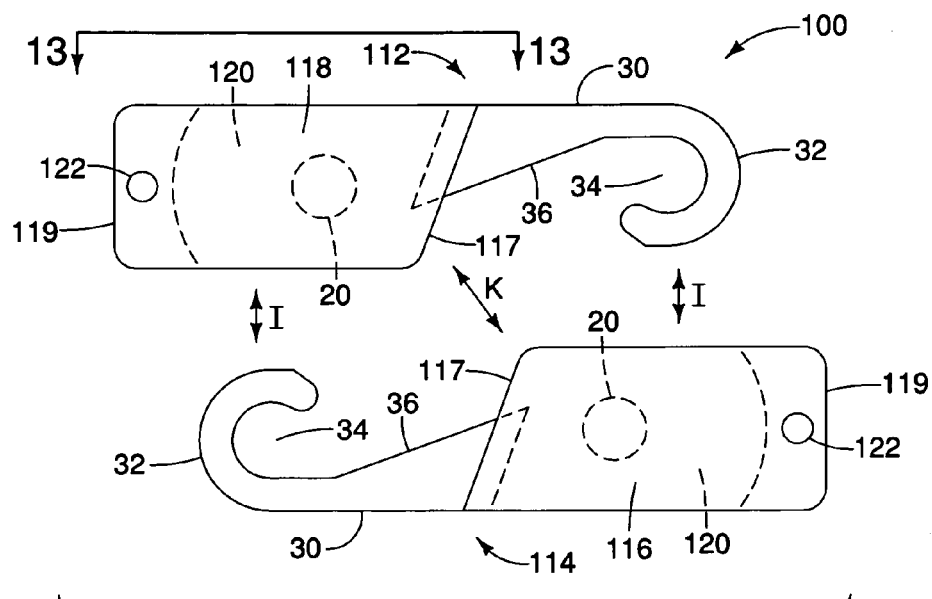
FIG. 12 is a side view of two hook parts of one variation encompassed within the scope of the current disclosure, and depicts how the hook parts can mate.

Referring now to FIG. 12, a further embodiment provides for a hook and connector device 100. The hook-connector device 100 is depicted in a side elevation view and includes a first hook part 112 and a second hook part 114. Each hook part 112, 114 includes a first plate 116 and a second plate 118. The plates 116, 118 are held in essentially parallel, spaced-apart relationship by hub 20. (Note that only one plate 116, 118 is visible for each hook part 112, 114 in the side elevation view of FIG. 12, but the plates 116, 118 are generally arranged in similar manner as plates 16 and 18 of the hook part 14 of FIG. 1.) Each hook part 112, 114 further includes a hook member 30 which includes a hook element 32. The hook member 30 of each hook part 112, 114 is attached to the hook part proximate a first end 117 of the plates 116 and 118. The hook element 32 of each hook part 112, 114 defines a hook opening 34 which is sized to receive the hub 20 of the corresponding hook part. Preferably, the hook opening 34 circumscribes an opening of less than 180 degrees and greater than about 160 degrees. The hook parts 112, 114 can mate to one another in a first mating arrangement by moving the hook parts in simultaneous directions I and K, such that the hook opening 34 of each hook element 32 engages the hub 20 of the corresponding hook part, similar to the mating arrangement depicted in FIG. 6 for the hook-connector device 10. When so mated, the hook element 32 of each hook part 112, 114 will snap-fit over the hub 20 of the corresponding hook part. Each hook element 30 is further defined by a sloped portion 36 which allows for avoidance of interference between with the hook member 30 of the corresponding hook part when placed in this mating configuration. While depicted as being a straight slope, the sloped portion 36 can be any shape which avoids interference between the hook members 30.

Figure 13:
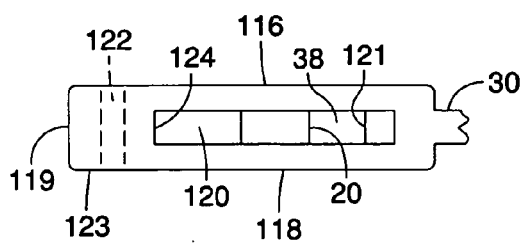
FIG. 13 is a top view of one of the hook parts depicted in FIG. 12.

Each plate 116, 118 of each hook part 112, 114 includes a cord opening 122 defined there-through proximate a second end 119 of the plates 116, 118. FIG. 13 is a partial top view of hook part 112 depicting how the plates 116 and 118 can be joined together by a solid portion 123 proximate the second end 119 of the plates, and how cord opening 122 passes through the solid portion 123. The plates 116 and 118, the solid portion 123, the end 121 of the hook member 30, and the hub 20 define openings 38 and 120 which are sized to receive the hook element 32 to thus allow the hook element 32 to fit over the hub 20. (It will be appreciated that the hook parts 12 and 14 of FIGS. 1 and 3 can also include a solid portion, similar to solid portion 123 of FIG. 13, which is disposed between the plates 16 and 18 proximate the second end 26 of the plates.)

Figure 13A:
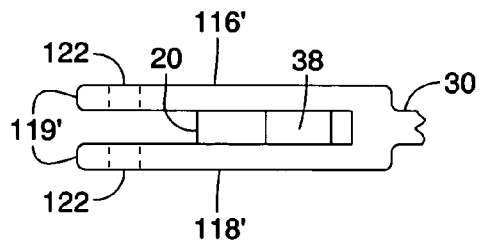
FIG. 13A is a variation of the hook part depicted in FIG. 13.

FIG. 13A is a partial top view of an alternative arrangement to that depicted in FIG. 13. In FIG. 13A, the plates 116' and 118' do not include a solid portion connecting the plates at plate ends 119', thus allowing for a greater degree of rotation of a hook element 32 about hub 20. This configuration is similar to the configuration depicted in FIG. 3 for hook part 12.

Figure 14:
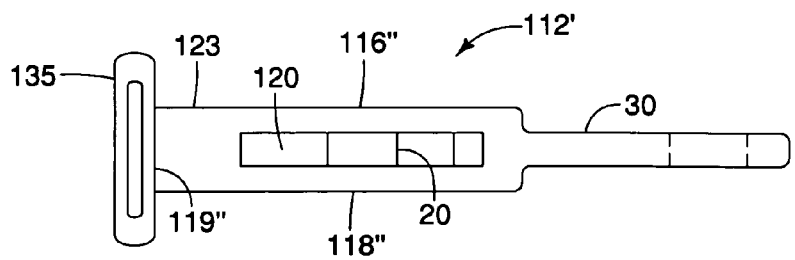
FIG. 14 is a top view of yet another variation of one of the hook parts depicted in FIG. 12.

FIG. 14 is a top view of yet another alternative configuration to that depicted in FIG. 13. In FIG. 14, the hook part 112' does not include a cord opening 122 disposed in the solid portion 123 at the second end 119" of the plates 116" and 118", but rather includes a strap connector 135 attached at the second end 119'". The strap connector 135 allows a strap, such as a nylon strap, to be used in place of a circular cord.

Figure 15:
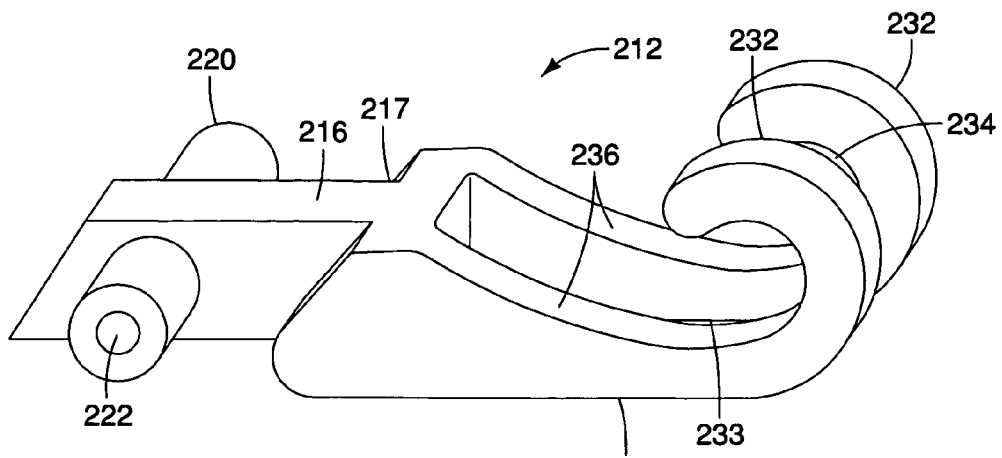
FIG. 15 is an oblique view of a hook part in accordance with yet another variation encompassed within the scope of the current disclosure.

Turning now to FIG. 15, a hook part 212 in accordance with yet another embodiment is depicted in an oblique view. It will be appreciated that a hook and connector device similar to that depicted in FIG. 1 can be provided for by providing two such hook parts 212 either in opposing relationship (similar to the manner depicted in FIG. 6 for hook parts 12 and 14), as well as in end-to-end relationship (similar to the manner depicted in FIG. 7). Each hook part 212 of a hook-and-connector device (which will include two or more such hook parts) includes a plate 216 and two hook members 231 and 233 attached to the plate 216 proximate a first end 217 of the plate. The hook members 231 and 233 are arranged in essentially parallel spaced-apart configuration, and the space between the hook members is generally sufficient to receive the plate 216 of a corresponding hook part between the hook members. The hook part 212 further includes two hubs 220 which are disposed on opposite sides of the plate 216 and are in general alignment with one another. A cord opening 222 is defined through the hubs 220 and the plate 216 in order to allow a cord to be attached to the hook part 212.

Each hook member 231, 233 in FIG. 15 is generally similar to the hook member 30 of the device depicted in FIG. 1. That is, each hook member 231, 233 includes a hook element 232 which defines a hook opening 234. The hook openings 234 are sized to receive the hubs 220 of a corresponding hook part. Preferably, at least one of the hook openings 234 circumscribes an opening of less than 180 degrees and greater than about 160 degrees. Each hook member 231, 233 is further defined by a sloped portion 236 which allows for avoidance of interference between with the hook members of a corresponding hook part 212 when two such hook parts are placed in a mating configuration similar to that depicted in FIG. 6. It will be appreciated that the hook part 212 of FIG. 15 is essentially an inverse of the hook part 12 of FIGS. 1 and 2—i.e., hook part 12 includes two plates 16 and 18, one hook member 30, and one hub 20, whereas hook part 212 includes one plate 216, two hubs 220, and two hook members 231, 233.

Figure 16:
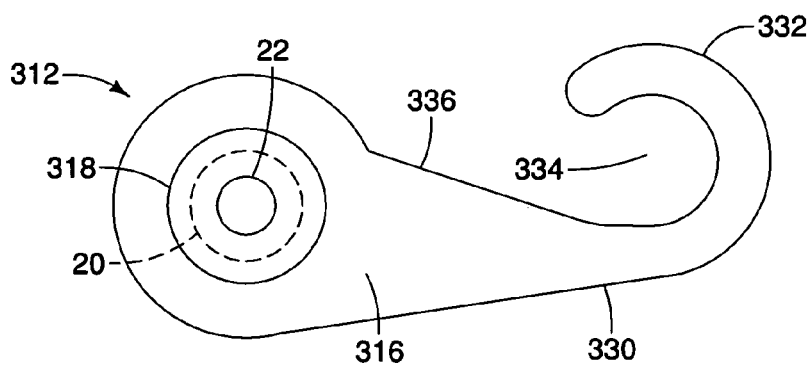
FIG. 16 is a side view of hook part in accordance with yet a further variation encompassed within the scope of the current disclosure.

FIG. 16 is a side elevation view of yet another hook part 312 in accordance with the present disclosure. The hook part 312 is configured to mate with a corresponding hook part (not shown in FIG. 16, but depicted in plan view in FIG. 17 as hook part 312') to form a hook-and-connector device in accordance with the current disclosure. Hook part 312 includes hook member 330, which includes hook element 332 and integral side plate 316. A hub 20 is attached to the inner surface of side plate 316. Hook element 332 defines hook opening 334 which is sized to receive hub 20. Preferably, the hook opening 334 circumscribes an opening of less than 180 degrees and greater than about 160 degrees to thus allow the hook element 332 to releasably snap-fit over the hub 20. The hook part 312 further includes a retaining member 318 which is attached to the opposite end of the hub 20 from the integral side plate 316. The retaining member 318 prevents the hook member 332 from slipping off of the hub 20 of a corresponding hook part when the two hook parts are engaged. The hook part 312 can include a cord opening 22 which passes through an opening continuously defined through the integral side plate 316, the hub 20, and the retaining member 318. The hook member 330 further defines a sloped surface 336 which provides access to hook opening 334.

Figure 17:
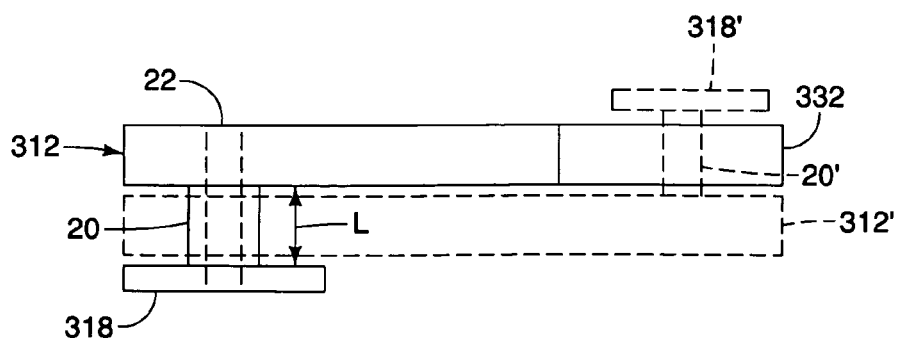
FIG. 17 is a plan view of the hook part of FIG. 16, depicting (in dashed-lines) how the hook part can mate with a corresponding hook part.

From a review of FIGS. 3 and 17 in conjunction, it will be appreciated that hook member 30 and side plate 16 of hook part 12 (FIG. 3) can constitute hook member 30 which includes hook element 32 (FIG. 5) and integral side plate 16. In this case side plate 18 of FIG. 3 constitutes the retaining member 318 of FIG. 17, side plate 18 is not required to be attached to the hook element 32.

FIG. 17 is a plan view of the hook part 312 of FIG. 16 depicting how a corresponding hook part 312' can mate with the hook part 312 in one mating arrangement (similar to the mating arrangement depicted in FIG. 6). As can be seen, the hook element 332 of hook part 312 engages the hub 20' of hook part 312', and is held onto the hub 20' by retaining member 318'. The hub 20 is defined by a length "L" which allows the hook element 332 of a corresponding hook part to fit over the hub. The hook parts 312 and 312' can also be connected in an end-to-end manner similar to the manner depicted in FIG. 7.

Figure 18:
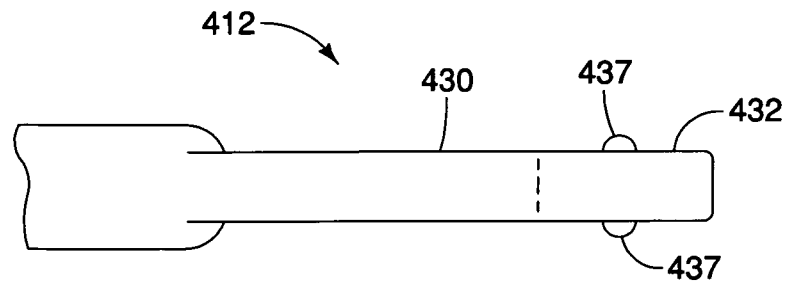
FIG. 18 is a partial plan view of an alternate hook member in accordance with a variation encompassed within the scope of the current disclosure.
Figure 19:
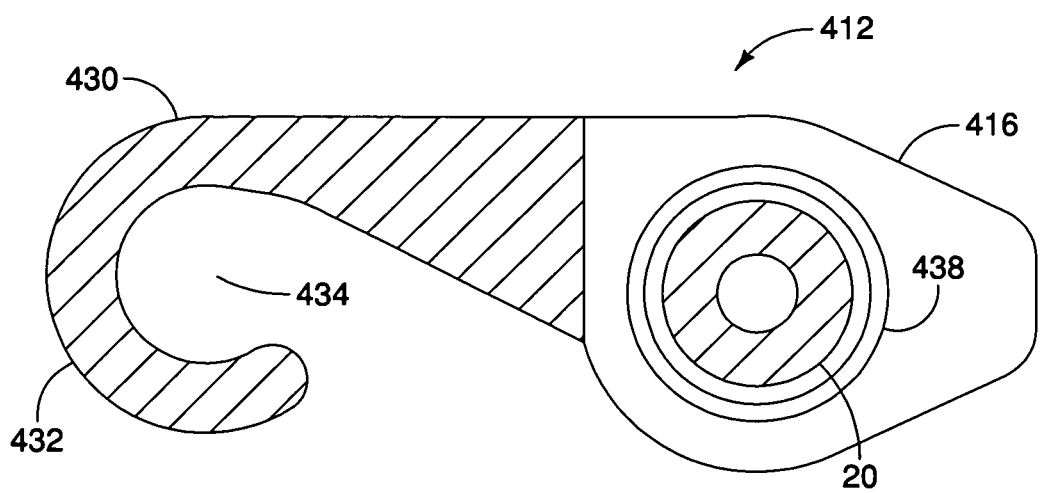
FIG. 19 is a side sectional view of a hook part configured to mate with the hook member depicted in FIG. 18.

Each of the hook elements (32, 232, 332) described above have a corresponding hook opening (34, 234, 334), which has been indicated as preferably circumscribing an opening of less than 180 degrees and greater than about 160 degrees. The purpose of providing a hook opening of less than 180 degrees is to allow the hook element (32, 232, 332) to snap-fit over the hub (20, 220) of a corresponding hook part. In general each hook part preferably includes a means for ensuring that two hook parts stay engaged with one another when the hook element of one hook part is fitted over the hub of a corresponding hook part. Providing a hook opening of less than 180 degrees is but one means for accomplishing this goal. Other means for ensuring a positive but releasable engagement of hook elements about hubs can be provided. One such alternate means is depicted in FIGS. 18 and 19. Specifically, FIG. 18 is a partial plan view of an alternative hook part 412 having a hook member 430. Hook member 430 includes hook element 432 (similar to hook element 32 of FIG. 2). However, hook member 432 of FIG. 18 does not necessarily define a hook opening of less than 180 degrees. In fact, the hook opening (not depicted) of hook element 432 can circumscribe an opening of greater than 180 degrees (but preferably less than about 200 degrees). Hook element 432 is provided with nubs or protrusions 437. More particularly, the hook element includes at least one nub 437 on one side of the hook element 432, and more preferably includes at least one nub 437 on each side of the hook element. In fact, two or more nubs 437 can be provided on each side of the hook element 432, provided that the nubs are arranged along a common radius about the circumference of the hook element. The nubs 437 are configured to fit within a groove provided on the inner side of each plate, as indicated in FIG. 19.

FIG. 19 depicts a side sectional view of the hook part 412 of FIG. 18. The hook part 412 includes a side plate 416 to which is attached hub 20. Hub 20 separates the plate 416 from a complementary and essentially parallel second plate which is not shown, but is generally similar to plate 18 of FIGS. 1 and 3. Plate 416 includes an annular groove 438 defined on the inner surface thereof, and radially disposed about hub 20. The groove 438 is sized to receive the nub 437 which is disposed on the hook element 432. Preferably, the complementary and essentially parallel second plate (not shown) also includes a similar groove defined on the inner surface thereof. Further, the two essentially parallel plates (plate 416, and a complementary plate not shown) are provided with sufficient compliance to allow the nub 437 to fit between the plates and be received within groove 438. Once nub 437 is received within groove 438, the two hook parts (412, and a complementary hook part) are secured together in a releasable configuration, and can rotate about one another (in the manner depicted in FIG. 7) by virtue of nub 437 travelling within groove 438. The two hook parts (412, and a complementary hook part) can thereafter be separated by pulling on one hook part to remove the nub 437 from the groove 438.

It will be appreciated that the same general result can be achieved by providing nubs on the inner surfaces of the plates, and corresponding grooves on the outer surfaces of the hook element. Further, with respect to the hook part 212 of FIG. 15, a similar arrangement can be afforded by providing nubs on the inner surfaces of hook elements 232 and corresponding grooves on the outer surfaces of plate 216 (or vice versa).

In one variation, the protrusions 437 of FIG. 18 are formed on the hook element 432 as solid hubs. (Alternately, the protrusions 437 of FIG. 18 can be formed on at least one of the inner surfaces of plates 416 (FIG. 17), and a complementary plate not shown). In another variation, the protrusions 437 of FIG. 18 can comprise spring-loaded protrusions which are mounted in the hook element 432 (or plate 416), and a spring member is located within the respective hook element (or plate) in order to allow the protrusion to retract as the hook element is passed between the plates and over the hub 20, at which point the protrusion is biased into the groove 438 in order to hold the two hook parts together in a releasable manner.

Figure 19A:
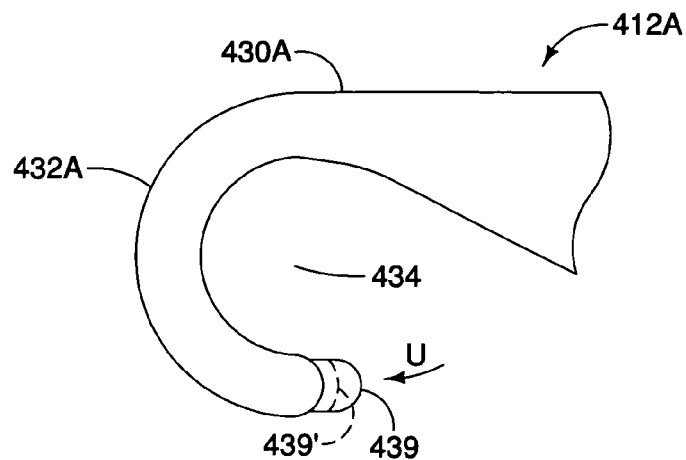
FIG. 19A is a partial side view of a hook part depicting how a hook element can be provided with a spring loaded tip in order to provide an alternative means for ensuring a positive and releasable engagement of the hook element about the hub of a corresponding hook part.

FIG. 19A is a partial side view of a hook part 412A depicting how a hook element 432A can be provided with a spring loaded tip 439 in order to provide an alternative means for ensuring a positive and releasable engagement of the hook element 432A about the hub (20, FIG. 19) of a corresponding hook part. As can be seen, spring loaded tip 439 can retract into the hook element 432A in direction "U" (to position 439'), thus increasing the diameter of the hook opening 434 in order to allow the hook opening to pass over the hub of a corresponding hook part. Preferably, when hook tip 439 is in the deployed position the hook opening circumscribes an opening of less than 180 degrees and greater than about 160 degrees, and when the hook tip 439 is in the retracted position (depicted by line 439') the hook opening circumscribes an opening about 180 degrees or more.

Figure 19B:
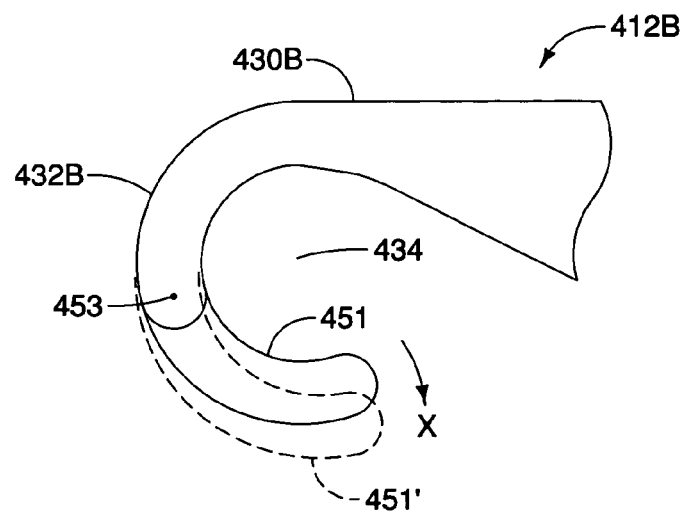
FIG. 19B is a partial side view of a hook part depicting how a hook element can be provided with a spring loaded end portion in order to provide yet another means for ensuring a positive and releasable engagement of the hook element about the hub of a corresponding hook part.

FIG. 19B is a partial side view of yet another a hook part 412B depicting how a hook element 432B can be provided with a spring loaded end portion 451 in order to provide yet another means for ensuring a positive and releasable engagement of the hook element 432B about the hub (20, FIG. 19) of a corresponding hook part. As can be seen, spring loaded end portion 451 is hinged at pivot 453 in order to allow the end portion 451 to pivot about the hook element 432B in direction "X" (to position 451'), thus increasing the diameter of the hook opening 434 in order to allow the hook opening to pass over the hub of a corresponding hook part. Preferably, when hook end portion 451 is in the deployed position the hook opening circumscribes an opening of less than 180 degrees and greater than about 160 degrees, and when the hook end portion 451 is in the extended position (depicted by lines 451') the hook opening circumscribes an opening about 180 degrees or more. The pivot 453 can be located at any point along the length of the hook element 432B, and can even be located where the hook element extend from the hook member 430B.

Figure 19C:
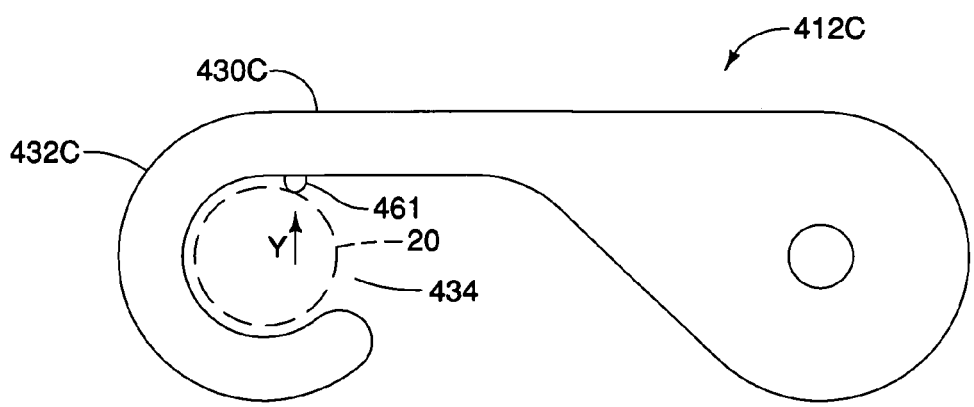
FIG. 19C is a side view of a hook part depicting how a hook member can be provided with a spring loaded protrusion in order to provide a further means for ensuring a positive and releasable engagement of a hook element about the hub of a corresponding hook part.

FIG. 19C is a side view of a hook part 412C depicting how the hook 430C member can be provided with a spring loaded protrusion 461 in order to provide a further means for ensuring a positive and releasable engagement of the hook element 432C about the hub 20 of a corresponding hook part. Protrusion 461 is configured to move in direction "Y" to allow the hub 20 to pass into the hook opening 434, after which the protrusion moves outward to retain the hub 20 in the hook opening. The hook part 412C can be removed from the hub 20 by applying a force to the hook part to cause the hub 20 to press against the protrusion 461, allowing it to retract in direction "Y" so that the hub can move out of the hook opening 434.

It will thus be appreciated that a preferred embodiment of the current disclosed apparatus includes a means for releasably securing two hook parts together to allow a hook element to stay in general position about a hub until removed by the application of a desired external force.

From the foregoing descriptions of FIGS. 1 through 19, it will be appreciated that different embodiments of the hook parts described herein can be used with one another. For example the hook parts 12 (FIG. 1), 112 (FIG. 2), 112' (FIG.

14), 212 (FIG. 15) and 312 (FIG. 16), as well as hook parts encompassed by FIGS. 13 and 13A, can be variously mated to one another in certain mating configurations.

Figure 20:
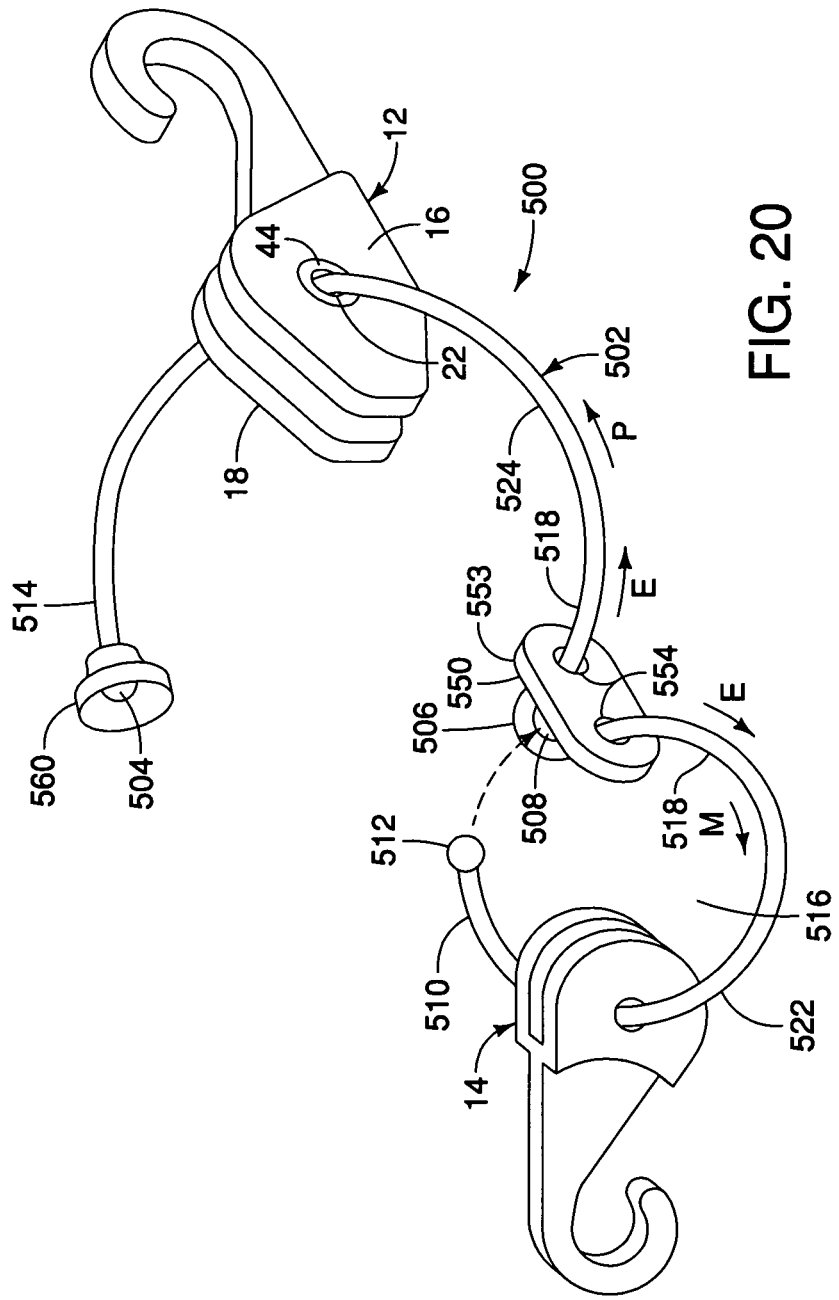
FIG. 20 is an isometric view of a cord and connector system which can be used with a hook part of the present disclosure.

Turning now to FIG. 20, a further embodiment of the present disclosure provides for a cord and connector system 500, which is depicted in isometric view. The cord and connector system 500 includes a hook part 12 and a cord 502. (It will be appreciated that the cord and connector system 500 can also be used with any of the other hook parts described herein.) The cord 502 includes a first end portion 514 which passes out of the cord opening 22 proximate plate 18, and a second cord portion 524 which passes out of the cord opening 22 proximate plate 16. The first end portion 514 of the cord 502 can optionally be provided with a cord-end securing member 560 that can be used to secure a free end (first end 514) of the cord 502 to the hook part 12 (as described more fully below with respect to FIG. 22), and which also prevents the cord end 514 from passing through and out of cord opening 22. A second end portion 510 of the cord 502 can be provided with a cord end member 512 (such as a knot or an attached ball, or a cord-end securing member 560) which prevents passage of the second end portion 510 of the cord through elements to be described further below (e.g., the cord openings 554 in cord length adjustment member 550). The cord and connector system 500 further includes a cord length adjustment member 550 (described more fully below with respect to FIG. 21) which is fitted to a cord portion 524 located between the plate 16 (of hook part 12) and the second end portion 510 of the cord 502. Cord portions 518, which are proximate to the cord openings 554 in the cord length adjusting member 550, can be pushed through the cord openings 554 in directions "M" and "P" in order to allow the cord length adjusting member to be moved along the cord portions 524 and 522. As cord portions 518 pass through the cord openings 554 on a first side 553 of the cord length adjusting member 550, they form a bight 508 with cord loop 506. The second free end 510 of the cord 502 can be passed through the bight 508, and as cord portions 518 are pulled in directions "E", the bight 508 will tighten around the cord end portion 510. This will in turn form a cord loop 516 defined by cord portion 522 disposed between cord end 510 and the cord length adjusting member 550. Further tension applied to either cord portion 524 and/or cord portion 522 will only cause the cord 502 to be placed in tension, and not slip through the cord openings 554 in the cord length adjusting member 550. A second hook member 14 can be disposed on the cord portion 522, and hook parts 12 and 14 can thus be connected together in either of the manners depicted (for example) in FIGS. 6 and 7. Further, the hook parts 12 and 14 of the cord and connector system 500 can be connected to other hook parts (not shown) to extend the reach of the system 500, as well as to anchor points (also not shown). The second free end 510 of the cord 502 can be optionally secured in the cord retainer area 558 of the cord length adjusting member (as described more fully below in FIG. 21). Thus, as can be seen, the length of the cord 502 can be adjusted to move the hook parts 12 and 14 along the length of the cord 502, to increase or decrease the effective length of the cord 502, and to move the position of the cord loop 516 along the length of the cord.

Figure 21:
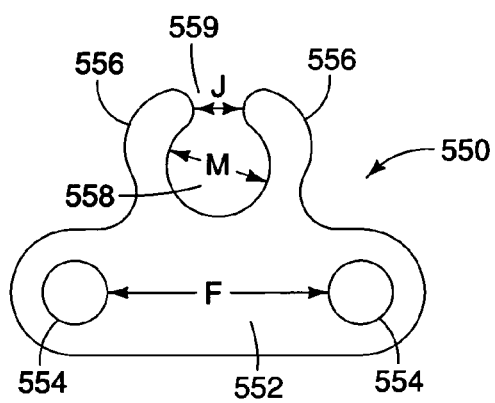
FIG. 21 is a plan view of a cord length adjuster that can be used in the cord and connector systems of FIGS. 9 and 20.

FIG. 21 is a plan view of a cord length adjuster 550 that can be used in the cord and connector system 500 of FIG. 20, and can also be used as an alternative to the cord length adjuster 56 of FIG. 9. The cord length adjuster 550 includes a body member 552 which is generally elongate in side view (not shown), and can be essentially flat in side view. The body member 552 includes two cord openings 554 disposed therein to allow a cord to pass through the body member (as depicted in FIG. 20). Inside edges of the cord openings 554 are spaced apart by a distance "F" which is preferably selected to be at least as wide as the diameter of a cord 502 (FIG. 20). The cord length adjuster 550 can optionally include a cord securing feature which is formed by arms 556 which extend outward from the body member 552 and form a cord passage 559 and a cord receptacle area 558. The cord receptacle area 558 is defined by a diameter dimension "M" which is selected to be essentially slightly less than the diameter of the cord 502 (FIG. 20) in order to prevent the cord from freely moving in the cord receptacle area 558. Further, the cord passage 559 is defined by a dimension "J" which is less than the diameter of the cord receptacle area 558, and the arms 556 are slightly resilient to allow the cord to be pressed into the cord receptacle area 558 and be retained therein.

Figure 22:
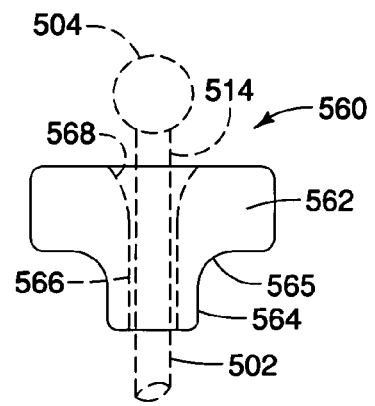
FIG. 22 is a side elevation view of a cord end securing member that can be used to secure a free end of a cord to a hook part of the present disclosure.

FIG. 22 is a side view of a cord end securing member 560 that can be used to secure a free end of a cord (e.g., cord end 514 of FIG. 20) to a hook part (e.g., hook part 12, FIGS. 1 and 20) of the present disclosure. The cord end securing member 560 is essentially circular in plan view (not depicted), and includes a neck 564 which is configured to be releasably press-fit into the cord opening 22 (FIG. 1) of the hook part 12. The cord end securing member 560 includes a shoulder 562, and a shaped portion 565 which connects the neck 564 and the shoulder 562. The shaped portion 565 is configured to fit within the chamfer 44 (FIG. 1) which surrounds the cord opening 22 (also FIG. 1) of the hook part 12. The cord end securing member 560 defines a cord opening 566 formed therethrough to allow a cord 502 to pass through the cord end securing member 560, and the cord 502 can be prevented from passing through the cord opening 566 at a first end 514 of the cord by providing the first end of the cord with a stop (such as knot 504).

Figure 23:
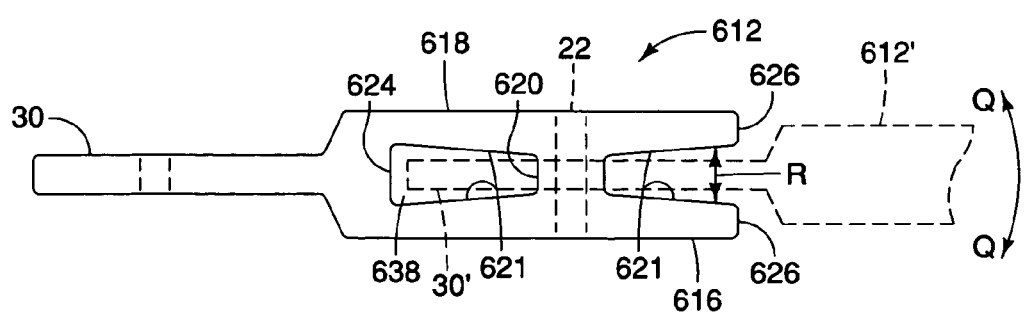
FIG. 23 is a plan view of an alternative configuration of a hook part in accordance with the present disclosure.

Turning now to FIG. 23, an optional configuration of a hook part 612 in accordance with the present disclosure is provided in plan view. FIG. 23 can be compared to FIG. 3 to easily discern the differences afforded in the variation depicted in FIG. 23. Specifically, the hook part 612 of FIG. 23 (which is in many aspects similar to the hook part 12 of FIG. 3) includes a hook member 30, and plates 616 and 618. Plates 616 and 618 are connected to one another, and disposed apart, by hub 20. Plates 616 and 619 are defined by inner surfaces 621 which diverge outward from one another as the inner surfaces 621 progress outward from the hub 620 to (1) the first end 624 of the plates, and (2) the second end 626 of the plates. That is, and for example, width dimension "R" between the plates from the hub 620 to the second end 626 of the plates increases as a function of the distance from the hub 620 to the end 626. Likewise, the width of the opening 638 increases as a function of the distance from the hub 620 to the first end 624 of the plates 616 and 618. In this way, when a corresponding hook part 612' is connected in an end-to-end arrangement (as depicted), the hook member 30' of the second hook part 612' can flex in directions "Q" about the hub 620 of the first hook part 612 (and vice versa). In this way a plurality of the hook parts 612 can be connected together in an end-to-end configuration and can ultimately form a closed loop of hook parts.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A hook-connector, comprising:
a first hook part and a second hook part, and wherein the first hook part and the second hook part each comprise:
a first plate and a second plate, the plates having a cord opening defined there-through;
a hub disposed between the first and second plates holding the first and second plates in essentially parallel, spaced apart relationship;
a hook member attached to a first end of at least one of the first and second plates, the hook member including a hook element defining a hook opening,
means for ensuring a positive and releasable engagement of each hook element about the hub of the corresponding hook part, and
wherein:
the hook opening is sized to receive the hub of a corresponding hook part; and
a sloped portion is defined on each hook member to allow the hook member to be guided into mating engagement with the hub of the corresponding hook part.

2. The hook-connector of claim 1 and wherein the means for ensuring a positive and releasable engagement of each hook element about the hub of the corresponding hook part comprises the hook opening circumscribing an opening of less than 180 degrees and greater than about 160 degrees to thereby allow the hook element to snap-fit over the hub of the corresponding hook part.

3. The hook-connector of claim 1 and wherein the means for ensuring a positive and releasable engagement of each hook element about the hub of the corresponding hook part comprises one of protrusions on outer surfaces of the hook element and grooves formed on inner surfaces of the plates, or grooves formed on the outer surfaces of the hook element and protrusions on the inner surfaces of the plates.

4. The hook-connector of claim 1 and wherein the means for ensuring a positive and releasable engagement of each hook element about the hub of the corresponding hook part comprises a spring-loaded portion of the hook element which allows the hook opening to temporarily increase as the hook element is passed over the hub of the corresponding hook part to thereby allow the hook element to fit about the hub of the corresponding hook part, and to thereafter decrease the hook opening after the hook element has passed over the hub of the corresponding hook part in order to hold the hook element and the hub in engagement with one another in a releasable manner.

5. The hook-connector of claim 1 and wherein the cord opening is positioned at the first at second plates where the plates are attached to the hub, and the cord opening is further defined through the hub.

6. The hook-connector of claim 1 and wherein the cord opening is positioned proximate a second end of the first and second plates which is distal from the first end of the plates.

7. The hook-connector of claim 1 and further comprising a solid portion which is disposed between the plates proximate a second end of the first and second plates which is distal from the first end of the plates.

8. A hook and connector device comprising:
a first hook part and a second hook part, and wherein the first hook part and the second hook part each comprise:
a plate defining a cord opening there-through;
first and second hubs disposed on opposite sides of the plate in general alignment with one another;
first and second hook members attached to the plate proximate a first end of the plate, the hook members being arranged in an essentially parallel spaced-apart configuration which allows the plate of a corresponding hook part to be received between the hook members, each hook member including a hook element defining a hook opening, and wherein:
the hook openings are sized to receive the hubs of the corresponding hook part; and
a sloped portion is defined on each hook member to allow the hook member to be guided into mating engagement with the hub of the corresponding hook part.

9. The hook and connector device of claim 8 wherein the cord opening is positioned on the plate where the hubs are attached to the plate, and the cord opening is further continuously defined through the hubs and the plate.

10. A hook and connector device comprising:
first and second hook parts, and wherein at least one of the hook parts comprises:
a hook member comprising a hook element defining a hook opening;
a hub attached to a first side of the hook member at a first end of the hub;
a retaining member attached to a second end of the hub; and wherein:
the hook opening is sized to receive the hub of a corresponding hook part, the hub is defined by a length which allows the hook element of a corresponding hook part to fit over the hub, and a cord opening is defined through at least one of the retaining member, the hub or the hook part; and
a sloped portion is defined on each hook member to allow the hook member to be guided into mating engagement with the hub of the corresponding hook part.

11. The hook and connector device of claim 10 and wherein the cord opening is defined through the retaining member, the hub and the hook part.

* * * * *